(12) United States Patent
Chen (10) Patent No.: US 10,698,209 B2
(45) Date of Patent: Jun. 30, 2020

(54) EMBEDDED HEAD-UP DISPLAY DEVICE

(71) Applicant: E-LEAD ELECTRONIC CO., LTD., Changhua (TW)

(72) Inventor: Stephen Chen, Changhua (TW)

(73) Assignee: E-LEAD ELECTRONIC CO., LTD., Changhua (TW)

( * ) Notice: Subject to any disclaimer, the term of this patent is extended or adjusted under 35 U.S.C. 154(b) by 7 days.

(21) Appl. No.: 16/158,084

(22) Filed: Oct. 11, 2018

(65) Prior Publication Data

US 2020/0116998 A1 Apr. 16, 2020

(51) Int. Cl.
| | |
|---|---|
| *G02B 27/01* | (2006.01) |
| *H04R 1/02* | (2006.01) |
| *G09G 5/10* | (2006.01) |
| *G06F 3/02* | (2006.01) |

(52) U.S. Cl.
CPC ..... *G02B 27/0101* (2013.01); *G02B 27/0149* (2013.01); *H04R 1/028* (2013.01); *G02B 2027/015* (2013.01); *G02B 2027/0118* (2013.01); *G02B 2027/0154* (2013.01); *G06F 3/0202* (2013.01); *G09G 5/10* (2013.01); *G09G 2320/0626* (2013.01); *G09G 2354/00* (2013.01); *G09G 2360/144* (2013.01); *G09G 2370/16* (2013.01); *G09G 2380/10* (2013.01); *H04R 2499/13* (2013.01); *H04R 2499/15* (2013.01)

(58) Field of Classification Search
CPC ... G02B 5/30; G02B 27/0149; G02B 27/0101
See application file for complete search history.

(56) References Cited

U.S. PATENT DOCUMENTS

| | | | | |
|---|---|---|---|---|
| 5,896,231 | A * | 4/1999 | Oikawa | B60K 35/00 359/631 |
| 9,823,472 | B2 * | 11/2017 | Kim | G02B 5/30 |
| 2018/0101005 | A1 * | 4/2018 | Yamazoe | H04N 5/64 |

* cited by examiner

*Primary Examiner* — Kevin M Nguyen
(74) *Attorney, Agent, or Firm* — Guice Patents PLLC (57) ABSTRACT

The present invention relates to an embedded head-up display device, which includes a device body, an image projection module, a convex mirror, a plane mirror and a concave mirror, which is provided to make good use of limited space in vehicles, the device body is provided to be embedded in a dashboard of a vehicle, a display image is enlarged without being bent and deformed by using the concave mirror, the convex mirror and the plane mirror, to thereby lengthen light paths for a further virtual image distance, to provide drivers with optimized visual effects, to thereby improve driving safety.

10 Claims, 6 Drawing Sheets

EMBEDDED HEAD-UP DISPLAY DEVICE

BACKGROUND OF THE INVENTION a) Field of the Invention

The present invention relates to an embedded head-up display device and, more particularly, to an embedded head-up display device provided to lengthen light paths for a further virtual image distance, which makes good use of limited space in vehicles, the device body of the present invention is provided to be embedded in a dashboard of a vehicle, to achieve a further virtual image distance without increasing the volume of the device of the head-up display device, to provide drivers with optimized visual effects, to thereby improve driving safety.

b) Description of Prior Art

The head-up display technology recently used in vehicles is not as complicated as head-up displays used in airplanes. It is an optical system, which is generally consisted of two main devices, a projector and a combiner. The projector is consisted of a signal source, a projection mirror and other optical components. The signal source of the projector is consisted of a LCD liquid crystal display or a CRT cathode ray tube. Light is emitted from the signal source and projected to the combiner (or a special transparent screen) set on a glass by the projector, the combiner is provided to show characters or images overlapped with real sights, relative technology could be referred to cited references U.S. Pat. No. 7,936,518, TW M491842, TW M541404, TW M543368, TW 1494603, TW 1444657, TW 1608249, TW announcement number 436662, TW publication number 200722788, TW publication number 201516475, TW publication number 201245764.

Figure 1:
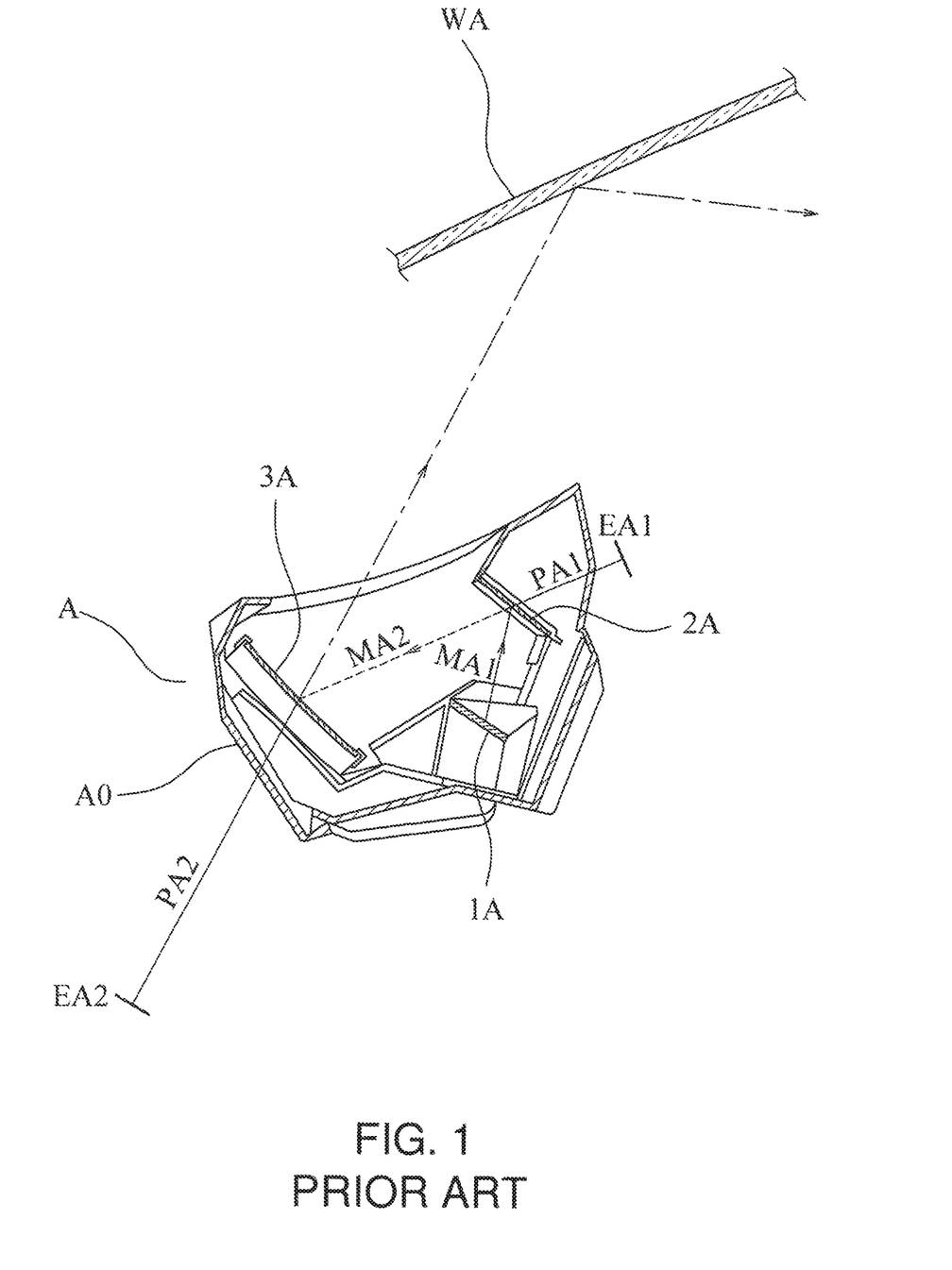
FIG. 1 is a schematic diagram of the structure and light paths of a conventional head-up display device.

As shown in FIG. 1, which is a schematic diagram of the structure and light paths of a conventional head-up display device A, wherein the head-up display device A includes a device body AO, an image projector 1A, a convex lens 2A and a concave lens 3A are set inside the device body AO. The display image of the image projector 1A is first projected through a first light path MA1 between the image projector 1A and the convex lens 2A and a first virtual image EA1 is formed, the size of the first virtual image EA1 may be reduced in proportion to a first image distance PA1. And then, the first virtual image EA1 is projected through a second light path MA2 between the convex lens 2A and the concave lens 3A and a second virtual image EA2 is formed, the size of the second virtual image EA2 may be magnified in proportion to a second image distance PA2. Finally, the display image is projected to a windshield WA by the concave lens 3A, and further, a virtual image is reflected to the user's eyes.

The concave mirror magnification multiplied by the object distance of the light path in front of the concave mirror is the image distance of the virtual image. Thus, to obtain a far image distance of the virtual image, the following are needed: (1) increasing the concave mirror magnification, but the ideal lens that makes the virtual image received by both eyes exactly the same cannot be made due to the process limitations of concave mirrors, the higher the magnification, the larger the image error, and the error caused by images received by both eyes may makes viewer feel dizzy, so the magnification is usually controlled within seven times for viewing comfort; (2) enlarging the object distance of the light path, since a conventional head-up display device is usually set on the dashboard in front of the driver and the space is limited, the virtual image distance of a conventional head-up display device could only be 2.5 meters away from the driver's eyes, an usual way for obtaining a better virtual image distance (about five times the virtual image distance) is to increase the volume of the head-up display device, but the space in the vehicle is limited and there are too many equipments that needed to be installed, so it is difficult to increase the volume of the head-up display device.

SUMARRY OF THE INVENTION

In view of this, the inventor finally completed the embedded head-up display device of the present invention after numerous improvements, namely, the object of the present invention is to provide an embedded head-up display device provided to lengthen light paths for a further virtual image distance, which makes good use of limited space in vehicles, the device body of the present invention is embedded in a dashboard of a vehicle, the display image is not bent and deformed by using the concave mirror, the convex mirror and the plane mirror, to achieve a further virtual image distance without increasing the volume of the device body of the head-up display device, to provide drivers with optimized visual effects, to thereby improve driving safety.

To achieve the object of the present invention, the embedded head-up display device of the present invention includes:

a device body, a capacity space and an opening are set inside it, and a circuit board is set on it;

an image projection module, which is set on the device body and electrically connected to the circuit board to receive a display image output by the circuit board and project the display image;

a convex mirror, which is set on the device body, and the convex mirror is provided to reflect the display image;

a plane mirror, which is set on the device body, the plane mirror is provided to reflect the display image reflected by the convex mirror;

a concave mirror, which is set on the device body, the concave mirror is provided to reflect the display image reflected by the plane mirror;

by the above structure, the distance between the convex mirror, the plane mirror and the concave mirror would not waste space, the convex mirror reduces the display image first, the plane mirror increases the distance of the light path, and the concave mirror enlarges the display image, so that the display image maintains the same magnification, to obtain a further distance of the light path, to thereby achieve a further virtual image distance without increasing the volume of the device body of the head-up display device.

The above device body further includes a lens hood, the convex mirror and the plane mirror are set on the lens hood, the lens hood is provided to eliminate stray lights generated by mutual reflections between the convex mirror, the plane mirror and the concave mirror.

The above device body is embedded in a dashboard of a vehicle, and the opening is covered by a transparent dust cover.

The embedded head-up display device of the present invention further includes a reflective film, the reflective film is provided to be attached to a windshield.

The above concave mirror, a motor gear set is set on its bottom, and the motor gear set is provided to rotate to adjust the reflection angle of the concave mirror.

The embedded head-up display device of the present invention further includes a keypad set, the keypad set is electrically connected to the circuit board and is provided to operate the embedded head-up display device.

The embedded head-up display device of the present invention further includes a light sensing module, the light sensing module is electrically connected to the circuit board and is provided to adjust the brightness of the image projection module.

The embedded head-up display device of the present invention further includes a speaker module, the speaker module is electrically connected to the circuit board, and the speaker module is used to inform the driver of voice messages.

The embedded head-up display device of the present invention further includes a wireless module, and the wireless module is electrically connected to the circuit board to receive signal data wirelessly transmitted from an electronic device.

The embedded head-up display device of the present invention further includes a connection module, and the connection module is electrically connected to the circuit board to receive signal data transmitted from an electronic device by wire.

The feature of the present invention is to provide an embedded head-up display device provided to lengthen light paths for a further virtual image distance, which makes good use of limited space in vehicles, the display image is not bent and deformed by using the concave mirror, the convex mirror and the plane mirror, to achieve a further virtual image distance without increasing the volume of the device body of the head-up display device, to provide drivers with optimized visual effects, to thereby improve driving safety.

DETAILED DESCRIPTION OF THE INVENTION

Figure 2:
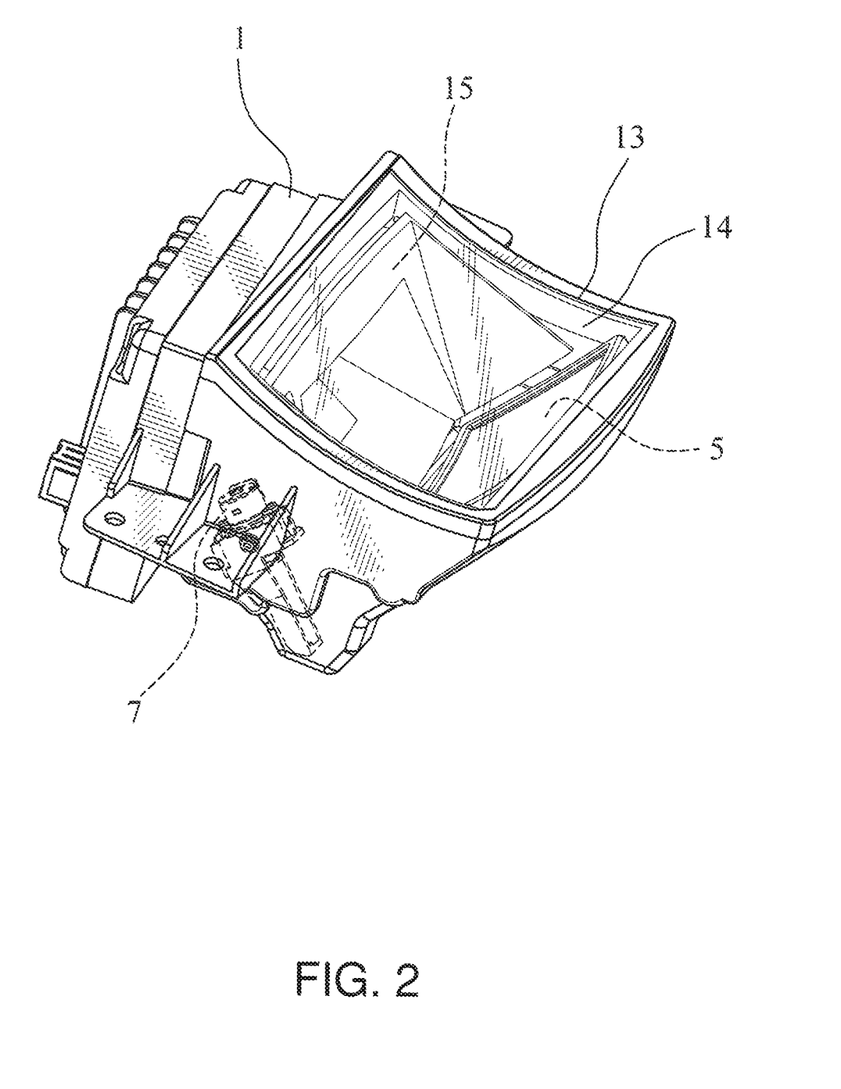
FIG. 2 is a schematic diagram of the present invention.
Figure 3:
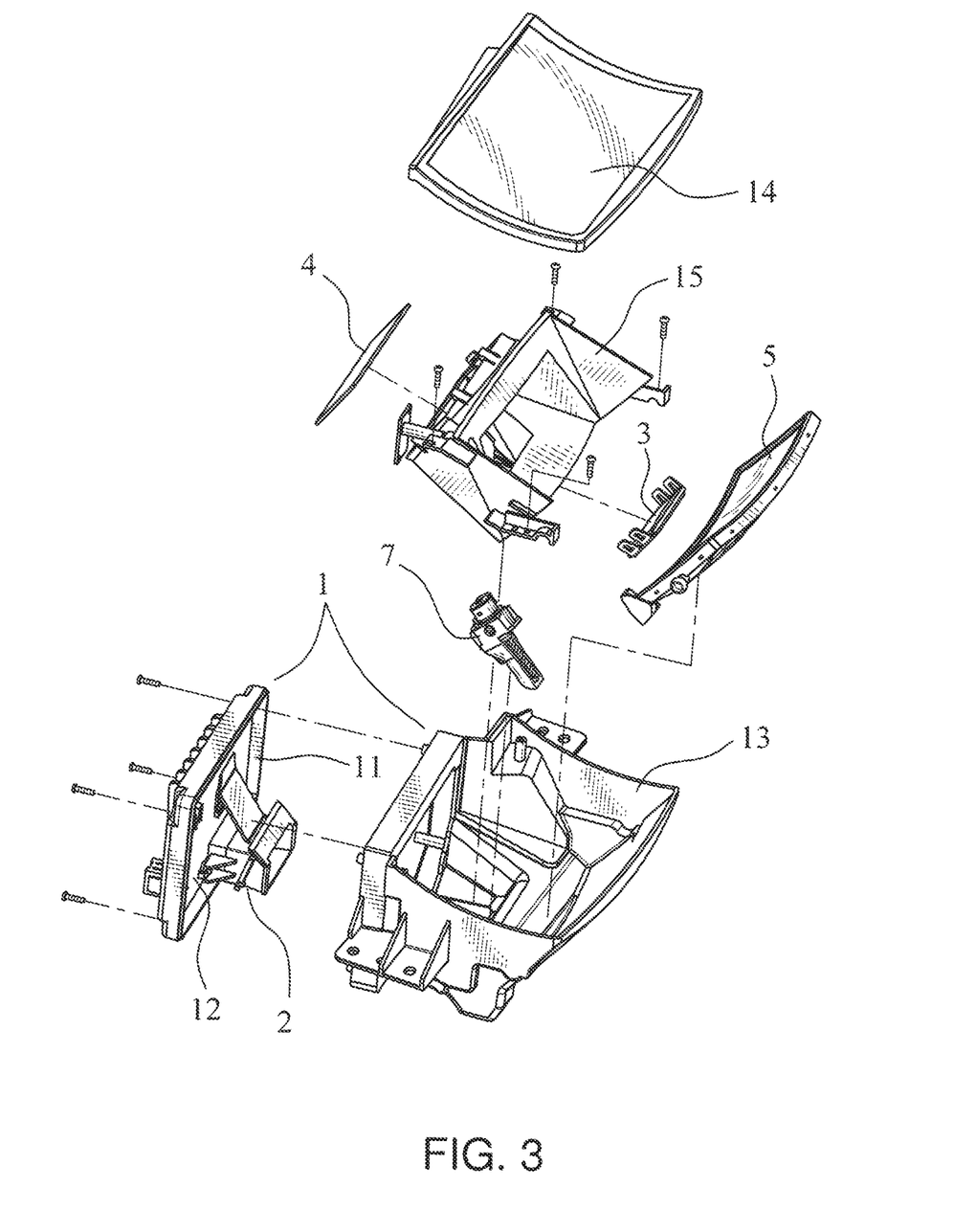
FIG. 3 is an exploded diagram of the present invention.
Figure 5:
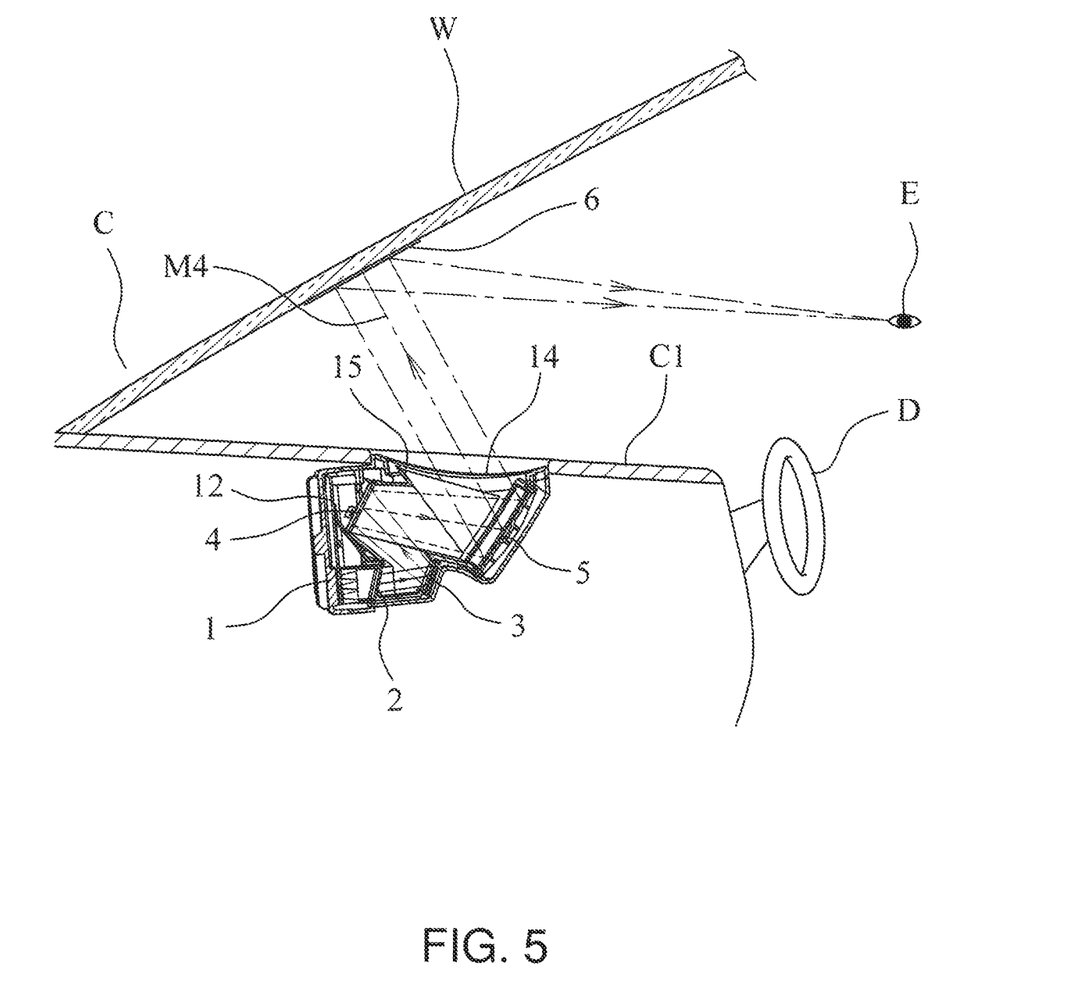
FIG. 5 is a schematic diagram of the embodiment of the present invention.
Figure 6:
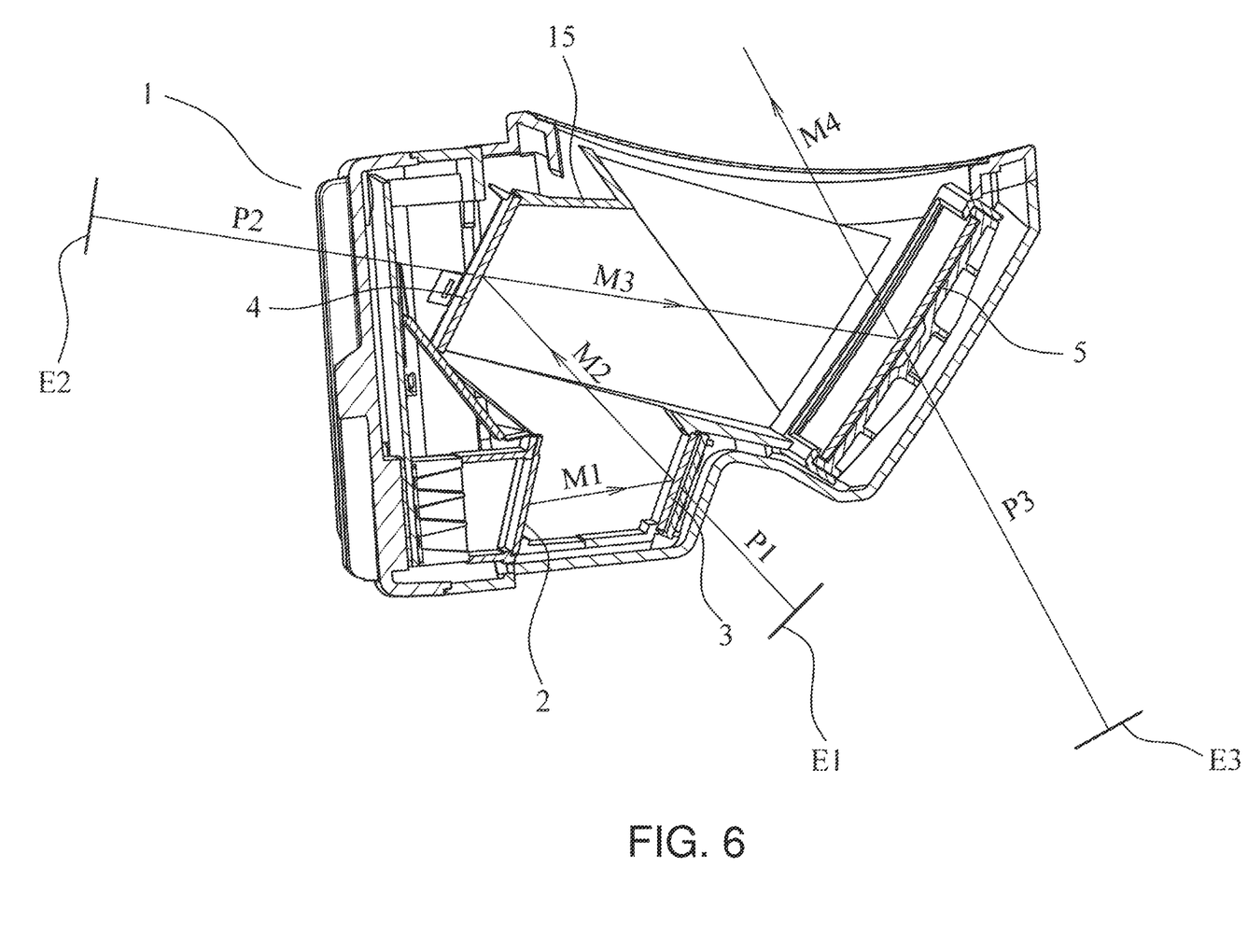
FIG. 6 is a schematic diagram of light paths of the present invention.

Please refer to FIG. 2 to FIG. 6, the embedded head-up display device of the present invention includes:

a device body 1, a capacity space 11 and an opening 13 are set inside it, a circuit board 12 is set on the device body 1, the circuit board 12 includes a processor 120, the processor 120 is used to control data processing and related information processing and output image information, the device body 1 is embedded in a dashboard C1 of a vehicle C, the opening 13 is covered by a transparent dust cover 14;

an image projection module 2, which is electrically connected to the circuit board 12, the image projection module 2 set on the device body 1 is used to receive a display image output by the circuit board 12 and project the display image as a first actual light path M1 (as shown in FIG. 6), the position of the image projection module 2 is located at a position of the dashboard C1 close to the steering wheel D, or a position close to the front side of the dashboard C1 (as shown in FIG. 5);

a convex mirror 3, which is set in the device body 1, the convex mirror 3 is located at a relative projection position of the image projection module 2 and is used to reflect the display image as a second actual light path M2;

a plane mirror 4, which is set in the device body 1, the plane mirror 4 is used to reflect the display image reflected by the convex mirror 3 as a third actual light path M3;

a concave mirror 5, which is set in the device body 1, the concave mirror 5 is used to reflect the display image reflected by the plane mirror 4 as a fourth actual light path M4, the magnification of the center of field of view and edge of field of view of the virtual image plane would be kept consistent by complementarity of the convex mirror 3 and the concave mirror 5, to correct distortion of the virtual image plane, the formula of absolute distortion is defined as $\delta u = U' - u'$, wherein U' is the height of the image point of the chief ray on any point of a plane object, u' is the ideal height of the image point of any extra axial point of the plane object, the technical means is well known to those skilled in the art, it is therefore not illustrated here.

The feature of the present invention is that the concave mirror, the convex mirror and the plane mirror are provided to prevent the display image from being bent or deformed, to thereby achieve a further distance of the light path without increasing the volume of the device body of the head-up display device, as shown in FIG. 6, the imaging formula of the convex mirror 3 is $1/p1 = 1/q1 + 1/f1 = 1/m1 + 1/f1$, wherein f1 is the focal length of the convex mirror 3, m1 is the object distance (it refers to the first actual light path M1 herein), p1 is the image distance (it refers to the first image distance P1 herein). The display image of the image projection module 2 is first projected through a first actual light path M1 between the image projection module 2 and the convex mirror 3 and a first virtual image E1 is formed, the size of the first virtual image E1 may be reduced in proportion to a first image distance P1. And then, the first virtual image E1 is projected through a second actual light path M2 between the convex mirror 3 and the plane mirror 4, the imaging formula of the plane mirror 4 is $1/p2 = 1/q2 = 1/m2$, wherein m2 is the object distance (it refers to the second actual light path M2 herein), p2 is the image distance (it refers to the second image distance P2 herein), and a second virtual image EA2 is formed. After being projected by the plane mirror 4, the light path of the virtual image is much longer than the actual light path, this is the method provided by the present invention to lengthen projection distance. Finally, the second virtual image E2 is projected through a third actual light path M3 between the plane mirror 4 and the concave mirror 5, the imaging formula of the concave mirror 5 is $1/p3 = 1/q3 - 1/f3 = 1/(p2+m3) - 1/f3$, wherein f3 is the focal length is the concave mirror 5, m3 is the object distance (it refers to the third actual light path M3 herein), p3 is the image distance (it refers to the second image distance P3 herein), a third virtual image E3 is formed, the size of the third virtual image E3 may be magnified in proportion to a third image distance P3. After being projected by the concave mirror 5, the magnification of the concave mirror 5 is larger and the virtual image distance would become further at the same total magnification, and a further distance of the light path could be obtained. In contrast, in a conventional head-up display, increasing the volume of the device body is the only way to maintain the same distance of the light path. It is non-obviousness of the present invention that a further virtual image distance would be obtained without increasing the volume of the device body of the head-up display device.

As shown in FIG. 3, the device body 1 further includes a lens hood 15, the convex mirror 3 and the plane mirror 4 are set on the lens hood 15, and the lens hood 15 is provided to eliminate stray lights generated by mutual reflections between the convex mirror 3, the plane mirror 4 and the concave mirror 5.

As shown in FIG. 5, the embedded head-up display device of the present invention further includes a reflective film 6, the reflective film 6 is attached to a windshield W, the concave mirror 5 reflects the fourth actual light path M4 reflected by the plane mirror 4, so that the display image is enlarged and projected to the reflective film 6, to thereby achieve the driver's eye E by the reflection of the reflective film 6.

The above concave mirror 5, a motor gear set 7 is set on its bottom, the motor gear set 7 is electrically connected to the circuit board 12, and the motor gear set 7 is provided to rotate to adjust the reflection angle of the concave mirror 5.

Figure 4:
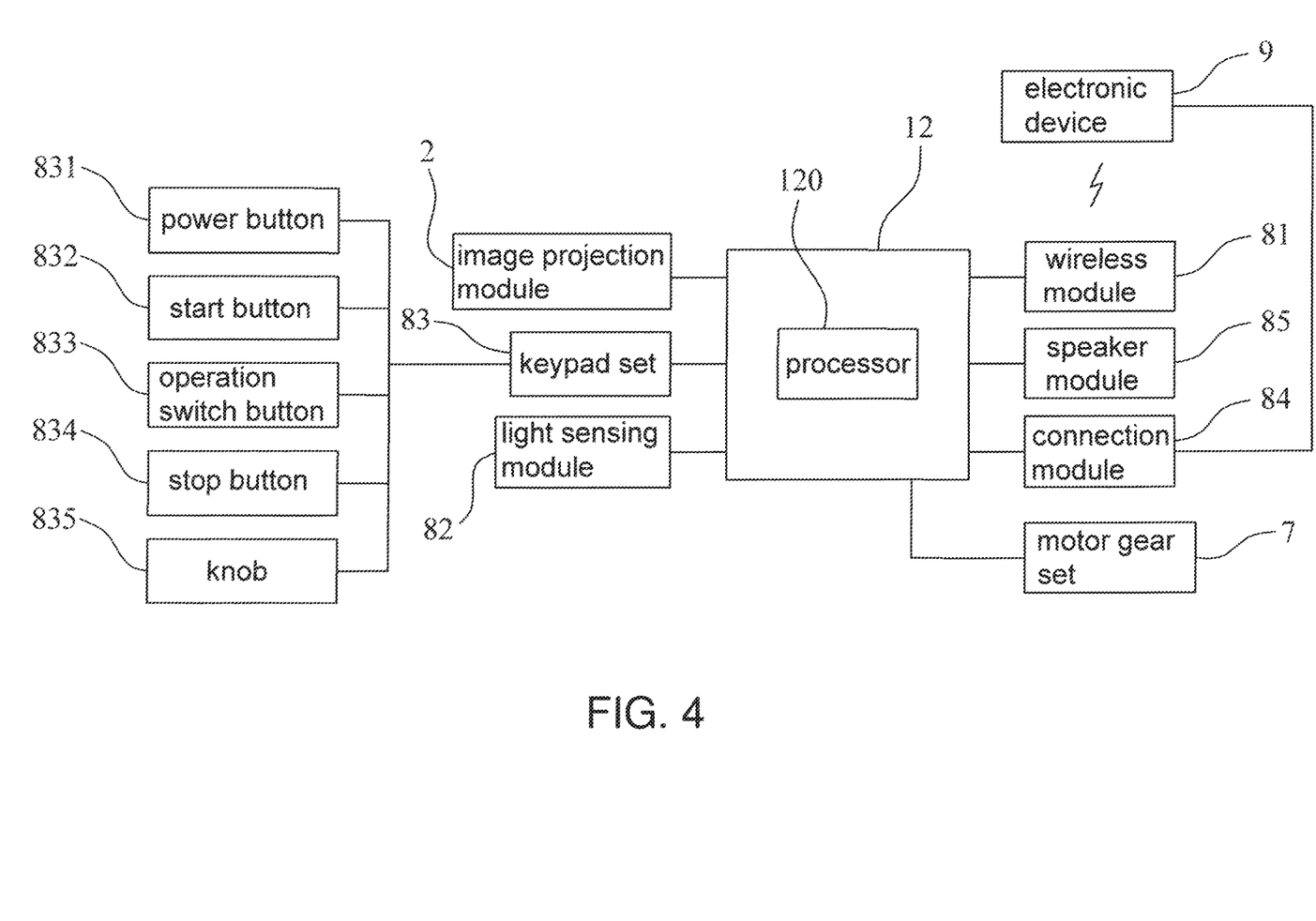
FIG. 4 is a block diagram of the present invention.

The embedded head-up display device of the present invention further includes a wireless module 81, the wireless module 81 is provided to receive signal data wirelessly transmitted from an electronic device 9. The wireless module 81 is Bluetooth or Wi-Fi. The electronic device 9 is a vehicle device, a vehicle host, a car audio device, a ceiling multimedia player, a headrest multimedia player, a hands-free device, a navigation device, a tire pressure detecting device, a smart phone or a tablet. The wireless module 81 shows the vehicle speed when wirelessly connected to the electronic device 9 of the vehicle, the image information could be messages of vehicle battery level, whether doors are closed or not, whether the rear trunk cover is closed or not, driving speed, road speed limit, navigation direction indication; if the electronic device 9 is a tire pressure detecting device, the image information shows the stare of tire pressure; if the electronic device 9 is a connected smart phone, except vehicle speed, various information transmitted from mobile APP could be showed, such as mobile music transmitted to the wireless module 81 wirelessly.

The embedded head-up display device of the present invention further includes a light sensing module 82, the light sensing module 82 is electrically connected to the circuit board 12 and is provided to adjust the brightness of the display image projected by the image projection module 2 and adjust the brightness of the display image according to the measured daylight intensity, so that the driver could see messages on the display image clearly.

The embedded head-up display device of the present invention further includes a keypad set 83, the keypad set 83 is set on the steering wheel D, the dashboard C1 of the vehicle C or the center console, and is electrically connected to the circuit board 12 and provided to operate the embedded head-up display device. The keypad set 83 includes a power button 831, a start button 832, an operation switch button 833, a stop button 834 and a knob 835; the power button 831 is used to open or close the embedded head-up display device; the start button 832 is used to start the motor gear set 7; the operation switch button 833 is used to switch the rotation direction of the motor gear set 7; the stop button 834 is used to stop the motion of the motor gear set 7; the knob 835 is used to manually adjust the brightness of the display image, wherein the knob 835 is rotated to the right for increasing the brightness and the display image would be brighter, the knob 835 is rotated to the left for reducing the brightness and the display image would be darker, so that the driver could see messages on the display image clearly.

The embedded head-up display device of the present invention further includes a connection module 84, the connection module 84 is electrically connected to the circuit board 12 and is provided to receive signal data transmitted from the electronic device 9 by wire. The electronic device 9 is a vehicle device, a vehicle host, a car audio device, a ceiling multimedia player, a headrest multimedia player, a hands-free device, a navigation device, a smart phone or a tablet.

The above embedded head-up display device further includes a speaker module 85, the speaker module 85 is electrically connected to the circuit board 12, and the speaker module 85 is provided to inform the driver of voice messages, audio files transmitted from the electronic device 9 could be played or used as warning sounds.

In the embedded head-up display device of the present invention, a further distance of light paths could be obtained by the light paths between the convex mirror, the plane mirror and the concave mirror without wasting space, therefore, a further projection distance could be obtained under the same magnification of the concave mirror 5.

What is claimed is:

1. An embedded head-up display device, which includes:
a device body, a capacity space and an opening are set inside it, and a circuit board is set on it;
an image projection module, which is set on the device body and electrically connected to the circuit board to receive a display image output by the circuit board and project the display image;
a convex mirror, which is set on the device body, and the convex mirror is provided to reflect the display image;
a plane mirror, which is set on the device body, the plane mirror is provided to reflect the display image reflected by the convex mirror;
a concave mirror, which is set on the device body, the concave mirror is provided to reflect the display image reflected by the plane mirror;
wherein the convex mirror reduces the display image, the plane mirror increases a light path, and the concave mirror enlarges the display image, so that the display image maintains the same magnification, to obtain a further distance of the light path, to thereby achieve a further virtual image distance.

2. The embedded head-up display device as claimed in claim 1, wherein the device body further includes a lens hood, the convex mirror and the plane mirror are set on the lens hood, the lens hood is provided to eliminate stray lights generated by mutual reflections between the convex mirror, the plane mirror and the concave mirror.

3. The embedded head-up display device as claimed in claim 1, wherein the opening is covered by a transparent dust cover, the device body is embedded in a dashboard of a vehicle.

4. The embedded head-up display device as claimed in claim 1, further includes a reflective film, the reflective film is provided to be attached to a windshield.

5. The embedded head-up display device as claimed in claim 1, wherein a motor gear set is set on the bottom of the concave mirror, and the motor gear set is provided to rotate to adjust a reflection angle of the concave mirror.

6. The embedded head-up display device as claimed in claim 1, further includes a keypad set, the keypad set is electrically connected to the circuit board and is provided to operate the embedded head-up display device.

7. The embedded head-up display device as claimed in claim 1, further includes a light sensing module, the light sensing module is electrically connected to the circuit board and is provided to adjust the brightness of the image projection module.

8. The embedded head-up display device as claimed in claim 1, further includes a speaker module, the speaker module is electrically connected to the circuit board, and the speaker module is provided to inform the driver of voice messages.

9. The embedded head-up display device as claimed in claim 1, further includes a wireless module, the wireless module is electrically connected to the circuit board to receive signal data wirelessly transmitted from an electronic device.

10. The embedded head-up display device as claimed in claim 1, further includes a connection module, the connection module is electrically connected to the circuit board to receive signal data transmitted from an electronic device by wire.

\* \* \* \* \*